United States Patent

Szinyi

(10) Patent No.: US 9,461,525 B2
(45) Date of Patent: Oct. 4, 2016

(54) ELECTRICAL MACHINE FOR USE IN THE AUTOMOTIVE SECTOR

(71) Applicant: Dr. Ing. h.c. F. Porsche Aktiengesellschaft, Stuttgart (DE)

(72) Inventor: Odon Szinyi, Weissach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 96 days.

(21) Appl. No.: 14/491,304

(22) Filed: Sep. 19, 2014

(65) Prior Publication Data

US 2015/0084453 A1 Mar. 26, 2015

(30) Foreign Application Priority Data

Sep. 23, 2013 (DE) .................. 10 2013 110 466

(51) Int. Cl.
*H02K 9/20* (2006.01)
*H02K 5/20* (2006.01)
*H02K 9/19* (2006.01)

(52) U.S. Cl.
CPC *H02K 9/20* (2013.01); *H02K 5/20* (2013.01); *H02K 9/19* (2013.01)

(58) Field of Classification Search
CPC ............ H02K 5/20; H02K 9/19; H02K 9/20
See application file for complete search history.

(56) References Cited

U.S. PATENT DOCUMENTS

| | | | |
|---|---|---|---|
| 4,574,210 A * | 3/1986 | Wieland | H02K 9/20 310/59 |
| 4,739,204 A * | 4/1988 | Kitamura | H02K 11/046 123/41.31 |
| 5,906,236 A | 5/1999 | Adams et al. | |
| 5,939,807 A * | 8/1999 | Patyk | H02K 5/161 310/64 |
| 6,107,708 A * | 8/2000 | Yamaguchi | B60H 1/00457 310/58 |
| 6,160,332 A * | 12/2000 | Tsuruhara | H02K 5/20 310/54 |
| 6,198,183 B1 * | 3/2001 | Baeumel | F04D 25/068 310/52 |
| 6,960,851 B2 * | 11/2005 | Poulin | H02K 9/19 310/52 |
| 7,777,373 B2 | 8/2010 | Bott | |
| 2002/0073621 A1 | 6/2002 | Clark | |
| 2005/0121988 A1 | 6/2005 | Howe et al. | |
| 2007/0199339 A1 | 8/2007 | Ishihara et al. | |
| 2008/0073985 A1 | 3/2008 | Bott | |

(Continued)

FOREIGN PATENT DOCUMENTS

| CN | 102710065 A | 10/2012 |
|---|---|---|
| DE | 102012011356 | 12/2012 |

(Continued)

OTHER PUBLICATIONS

Chinese Office Action Dated Jun. 3, 2016.

(Continued)

*Primary Examiner* — Dang Le
(74) *Attorney, Agent, or Firm* — Gerald E. Hespos; Michael J. Porco; Matthew T. Hespos

(57) ABSTRACT

An electrical machine for an automotive vehicle has a housing (4). A stator arrangement (8) and a rotor arrangement (6) are disposed in the housing (4). At least one clearance (10) is formed in the housing (4) in proximity to the stator arrangement (8) and the rotor arrangement (6). A heat transmission device (12) is inserted into the clearance (10) as a prefabricated heat transmission module.

10 Claims, 1 Drawing Sheet

(56) References Cited

U.S. PATENT DOCUMENTS

2011/0298315 A1   12/2011  Fulton
2012/0262021 A1   10/2012  Lafontaine et al.
2014/0265659 A1*  9/2014  Chamberlin ............. H02K 5/20
                                                    310/54

FOREIGN PATENT DOCUMENTS

| | | |
|---|---|---|
| DE | 102011111667 | 3/2013 |
| JP | 55134768 U1 | 3/1954 |
| JP | 61065858 U1 | 5/1986 |
| JP | 06-062547 | 3/1994 |
| JP | 06-141507 | 5/1994 |
| JP | 2004312886 A | 11/2004 |
| JP | 2008515366 A | 5/2008 |
| WO | 2005008860 | 1/2005 |

OTHER PUBLICATIONS

Korean Office Action.

* cited by examiner

ELECTRICAL MACHINE FOR USE IN THE AUTOMOTIVE SECTOR

CROSS REFERENCE TO RELATED APPLICATION

This application claims priority on German Patent Application No. 10 2013 110 466.5, filed Sep. 23, 2013, the entire disclosure of which is incorporated herein by reference.

BACKGROUND

1. Field of the Invention

The invention relates to an electrical machine for use in the automotive sector, comprising a housing that has a stator arrangement, a rotor arrangement and a heat transmission device provided in the housing.

2. Description of the Related Art

Electrical machines with a heat transmission device are well known in the automotive sector. For instance, DE 10 2011 038 529 A1 discloses a fluid-cooled electrical machine that has a housing with a cooling device to cool the electrical machine, and in particular the stator and rotor arrangement. However, the housing of this electrical machine can be produced only with very great effort in terms of assembly.

The object of the invention therefore is to provide an electrical machine that has a heat transmission device and can be produced in an easy and low-cost way.

SUMMARY OF THE INVENTION

The invention relates to an electrical machine that has a housing with at least one clearance in which a heat transmission device can be inserted as a prefabricated heat transmission module. Thus, the electrical machine can be produced easily and the heat transmission device can be adapted easily to the power output of the electrical machine and hence to the heat dissipation of the electrical machine.

The clearance may extend over at least 180° of the housing so that the prefabricated heat transmission module can come into effective contact with as large a part of the circumference of the electrical machine as possible. The clearance also may at least one through-opening. In this way, for example, connections for the heat transmission device can be connected easily to cooling fluid supply or discharge lines running outside the electrical machine. The prefabricated heat transmission module can be inserted into the housing from the outside.

The housing may be produced from aluminum, for example by sand casting, precision casting or diecasting. If the rotor arrangement is an external rotor, the transporting away of the heat that is produced at the rotor arrangement during operation of the electrical machine can be performed easily.

The housing may be made from a composite material, for example from a plastic composite such as CRP or a metal-ceramic composite MMC. Thus, the housing has a reduced thermal conductivity, and heat produced can be removed reliably.

The heat transmission module may be an evaporator and may be incorporated in an air-conditioning system of the motor vehicle. The heat transmission module also may be a heat exchanger, and water may be the coolant.

The heat transmission module may have a heat sink and two formed-on cooling end pieces. The heat sink may be produced from an extruded, form-rolled aluminum profile and easily can be adapted to a wide variety of forms of housings.

DETAILED DESCRIPTION

Figure 1:
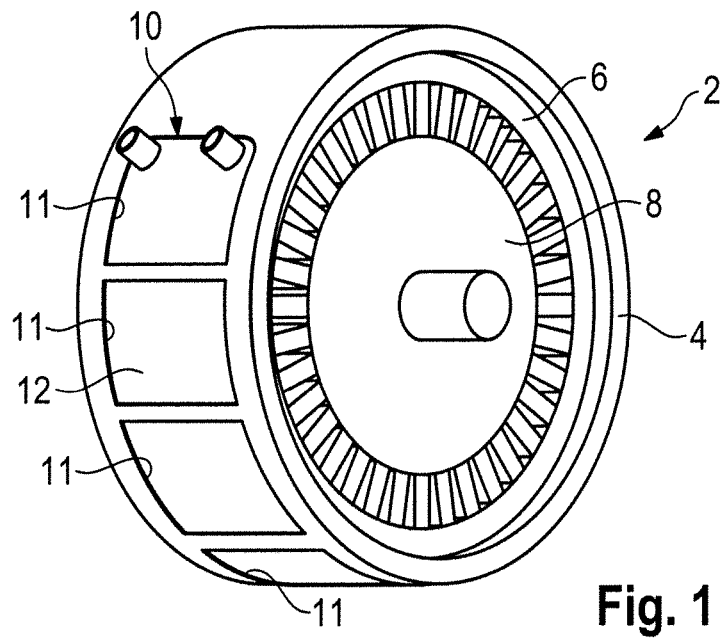
FIG. 1 is a perspective view of an electrical machine according to the invention.

FIG. 1 is a perspective view of an electrical machine 2 that functions to drive a fan, not represented any more specifically, of an air-conditioning system in a motor vehicle. The electrical machine 2 has a housing 4 produced from aluminium. A rotor arrangement 6, formed as an external rotor, and a stator arrangement 8 are arranged in the housing 4 in a known way. The housing 4 has a clearance 10 in which a heat transmission device 12 is arranged. In the present exemplary embodiment, the clearance 10 extends over about 300° and has multiple through-openings 11 to ensure optimum heat exchange between the rotor and stator arrangement 6, 8 on the one hand and the heat transmission device 12 on the other hand. The heat transmission device 12 is configured according to the invention as a prefabricated heat transmission module.

Figure 2:
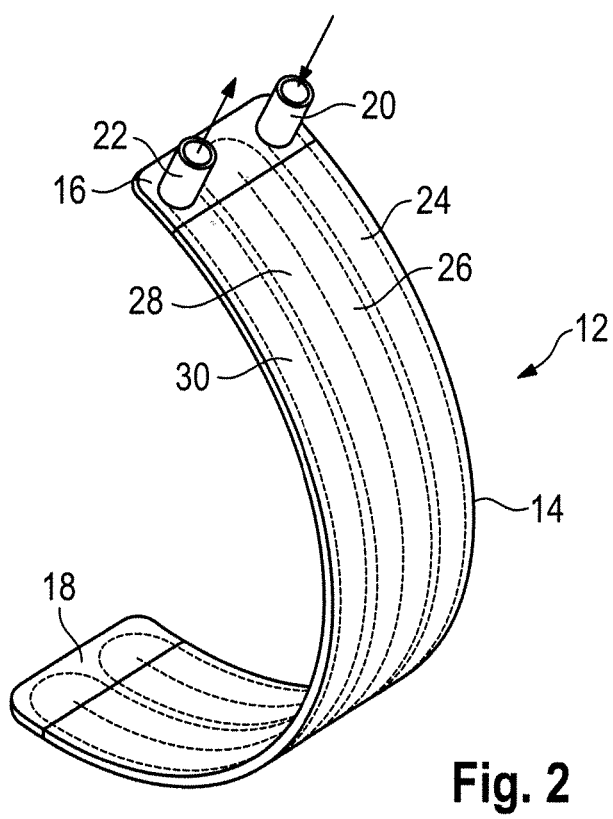
FIG. 2 is a perspective representation of a heat transmission module.

FIG. 2 shows the heat transmission device 12 as a prefabricated heat transmission module in a perspective view on its own. The heat transmission module 12 has three parts, namely, a heat sink 14 and two cooling end pieces 16, 18. The cooling end pieces 16, 18 are produced as castings. The cooling end piece 16 has an inflow member 20 and an outflow member 22. In the present case, the inflow member 20 can be used for feeding a coolant to the heat sink, and the coolant is returned by way of the outflow 22 into the air-conditioning circuit that is not represented any further. In this exemplary embodiment, the heat transmission module 12 therefore is formed as an evaporator. However, it should be clear that the heat transmission module 12 can also be used as a heat exchanger with a coolant, for example water. Sections of line 24, 26, 28 and 30 are represented in the form of dashed lines.

The coolant enters the first section of line 24 by way of the inflow member 20 and undergoes a reversal of direction in the cooling end piece 18, to then flow in the section of line 26 in the direction of the cooling end piece 16. The sections of line 28, 30 are provided in the same way, so that it is ensured that the heat sink 14 is flowed through spirally to ensure an optimum heat transfer. The heat sink 14 is an extruded aluminum profile, and the sections of line 24, 26, 28 and 30 that form cooling ducts having been produced by the forming. The aluminum profile subsequently has been form-rolled and thus adapted optimally to the housing 4. The circumferential angle that the heat transmission module 12 includes can be adapted to the housing and to the power output, and consequently to the desired heat dissipation of the electrical machine 2. It should also be clear that several of these heat transmission modules 12 can be arranged in series in the housing 4. Furthermore, heat transmission modules 12 may be arranged in the housing 4 in a known way, such as for example clipping, screwing, plugging. The housing 4 advantageously is produced from plastic.

What is claimed is:

1. An electrical machine for an automotive vehicle, comprising:

a housing having an outer surface and a clearance formed in the housing, and at least one through-opening formed in the outer surface communicating with the clearance, a stator arrangement and a rotor arrangement provided in the housing, and a heat transmission device inserted into the clearance as a prefabricated heat transmission module, the heat transmission device having a heat sink with a plurality of parallel cooling ducts open at opposite first and second ends of the heat sink, the heat sink being curved so that the cooling ducts extend through an arc around a part of the rotor and the stator, first and second cooling end pieces connected respectively to the first and second ends of the heat sink, the first cooling end piece having an inflow member and an outflow member communicating respectively with two of the plurality of cooling ducts, and the second cooling end piece providing communication between two of the cooling ducts.

2. The electrical machine of claim 1, wherein the clearance extends over at least 180° of the housing.

3. The electrical machine of claim 1, wherein the housing is produced from aluminum.

4. The electrical machine of claim 1, wherein the housing is produced from a composite material.

5. The electrical machine of claim 1, wherein the rotor arrangement is an external rotor.

6. The electrical machine of claim 1, wherein the heat transmission module is an evaporator.

7. The electrical machine of claim 1, wherein the heat transmission module is a heat exchanger.

8. The electrical machine of claim 7, wherein the heat sink is produced from an extruded, form-rolled aluminum profile.

9. The electrical machine of claim 1, wherein the first cooling end piece has at least one U-shaped passage providing communication between at least two cooling ducts that do not communicate with the inflow and outflow members.

10. The electrical machine of claim 1, wherein the second cooling end piece has a plurality of U-shaped passages, each of the U-shaped passages providing communication between two of the cooling ducts.

* * * * *